United States Patent [19]

Cass

[11] Patent Number: 4,591,525

[45] Date of Patent: May 27, 1986

[54] TRANSPARENT THERMOPLASTIC SHEET

[75] Inventor: Michael Cass, Blackburn, England

[73] Assignee: Imperial Chemical Industries PLC, London, England

[21] Appl. No.: 633,891

[22] Filed: Jul. 24, 1984

[30] Foreign Application Priority Data

Aug. 3, 1983 [GB] United Kingdom ............... 8320969

[51] Int. Cl.⁴ .............................................. B32B 3/02
[52] U.S. Cl. .................... 428/195; 273/1 R; 273/DIG. 14; 428/203; 428/204; 428/207; 428/904.4
[58] Field of Search ............... 428/195, 204, 207, 210, 428/211, 904.4, 913, 201, 203, 918; 273/1 R, DIG. 14

[56] References Cited

FOREIGN PATENT DOCUMENTS 2118096A 10/1983 United Kingdom ............... 428/210

*Primary Examiner*—Bruce H. Hess
*Attorney, Agent, or Firm*—Cushman, Darby & Cushman

[57] ABSTRACT

A thermoplastic sheet carrying a pattern of opaque dots or lines covering between 20 and 70% of the area of one surface of the sheet wherein the sheet has chromaticity coordinates (x,y), calculated using Illuminant C as reference, lying within the area of a circle of radius 0.15 scale units drawn with the center of the circle at coordinates (0.33, 0.33) and a tristimulus value (Y) of between 10 and 70, the chromaticity coordinates and the tristimulus values being calculated according to the 1931 Commission Internationale de l'Eclairage (CIE) Colorimetric System in the absence of the applied pattern. The sheet provides differential two-way vision effects and is suitable for games courts and security glazing.

10 Claims, No Drawings

TRANSPARENT THERMOPLASTIC SHEET

This invention relates to plastics sheets suitable for use in applications in which visibility through the sheet is different when viewed from one side of the sheet to the visibility viewed through the other side of sheet.

A very successful squash court has recently been used in which all the walls of the court are transparent, thereby permitting viewing from all aspects surrounding the court by spectators and television cameras. The players are able to perform without the distraction of being conscious of the spectators and movement outside the court because the transparent acrylic sheet used for the walls is printed on the playing surface of the court walls with a pattern of dots which when illuminated from inside the court effectively gives the appearance of an opaque wall to the player. On the other hand the pattern of dots does not noticeably restrict the vision of spectators or television cameras into the court so that a one-way viewing effect is obtained. For optimum effect the acrylic sheet used in this squash court was printed with a pattern of white dots superimposed on black dots, the surface exhibiting the white dots being used as the playing surface and the black dots facing the spectators and television cameras. The register of the white dots with the black dots is not easy to achieve in practice. The present invention eliminates this difficult printing step.

According to the invention there is provided a sheet carrying a pattern of opaque dots or lines covering between 20 and 70% of the area of one surface of the sheet wherein the sheet has chromaticity coordinates (x,y), calculated using Illuminant C as reference, lying within the area of a circle of radius 0.15 scale units drawn with the centre of the circle at coordinates (0.33, 0.33) and a tristimulus value (Y) of between 10 and 70, the chromaticity coordinates and the tristimulus values being calculated according to the 1931 Commission Internationale de l'Eclairage (CIE) Colorimetric System in the absence of the applied pattern.

In a preferred sheet the radius of the circle is not greater than 0.1 scale units and more desirably the radius is not greater than 0.075 scale units. The preferred limits for the tristimulus value (Y) or percentage luminous transmittance are 15 to 60.

Sheets according to the above definition are tinted sheets carrying a pattern of dots or lines which preferably are white dots or lines. The sheets can fulfil the same light controlling function as those clear sheets in which a pattern of white spots are in register with a pattern of black dots, that is to say, when viewed under good illumination from the side carrying the white dots the sheet appears opaque even though only 20 to 70%, preferably 25 to 50% of the surface of the sheet is obscured by the opaque pattern. When viewed from the other side of the sheet into the area of higher illumination good vision through the sheet is obtained. It is preferred that the pattern of dots or lines is a regular pattern of from 1 to 25 dots or lines per linear cm. It is preferred that the tinted sheet has a neutral appearance, that is to say that the sheet contains pigments and/or dyes which give a black or brown tint to the sheet. Such sheets preferably have x and y coordinates lying within a circle having a radius of 0.075 scale units with a centre at (0.33, 0.33).

The sheet of the invention can take a number of forms including laminates. The pattern of dots or lines can be printed directly onto the tinted sheet. Alternatively the sheet can carry the pattern embedded in the surface of the sheet or within the interior of the sheets.

A suitable method for providing a pattern in the surface of the sheet, which is particularly applicable to acrylic thermoplastic sheet, is by polymerising monomer or a partially polymerised polymer-in-monomer syrup in a cell, a wall of which has been printed with the desired pattern, using an ink suitable for printing on the material of the cell wall, which will normally be of glass. On completion of the polymerisation the pattern will be a part of the surface of the sheet. The sheet will have a planar surface with the pattern of dots or lines being level with the surface of the sheet. A sheet according to the invention can thus be prepared by incorporating dyes and/or pigments in the polymerising reactants to give the desired chromaticity and tristimulus values. The pattern on the sheet prepared in this way has superior abrasion resistance to the pattern on printed sheet.

Even greater protection is obtained if the pattern is sandwiched in a laminate. The laminate may take several forms. Thus a clear sheet may be laminated to a tinted sheet (having the defined parameters) carrying a pattern either as a printed pattern or as an embedded pattern. Yet again, the pattern may be printed on or embedded in the surface of a clear sheet which is laminated to a tinted sheet conforming to the defined chromaticity and tristimulus parameters to provide a laminated sheet. Thus the dual requirement of a pattern of dots or lines and a defined level of tinting may be provided in the same or different sheets making up the laminate.

The overall thickness of the sheet will depend on the use to which the sheet is to be put but where the sheet is intended to be used in a squash court the thickness should be sufficient to provide a large area structure which can be assembled to provide a rigid, flat playing surface. The overall thickness should be at least 10 mm, preferably at least 15 mm.

When assembled in a squash court the sheet of the invention should have the patterned surface forming the playing surface of the court if the pattern is printed on or embedded in the surface of the sheet.

When the sheet of the invention is intended for use in a squash court and is a laminate with a clear sheet which is adhesively bonded to a tinted sheet which carries a pattern printed on or embedded in the surface the additional clear sheet may have a thickness of up to 5 mm but is preferably 2 mm or less. The laminate is assembled around the court so that the additional clear sheet provides the playing surface, protecting the pattern from abrasion in use but providing the appearance of an opaque wall when illuminated from inside the court.

When the pattern is provided on or in the surface of a clear sheet in a laminate with a suitably tinted sheet as defined, the clear sheet must form the playing surface of the court and should have a thickness of not greater than 5 mm, preferably not more than 2 mm if intended for use in a squash court, again being assembled in use with the clear sheet forming the playing surface.

The material of the sheet or laminated sheet of the invention is any material which can be formed into a transparent sheet and into which pigments and/or dyes can be introduced to provide the appropriate light controlling parameters. It is preferred that the material of the sheet is a thermoplastic material, particularly an acrylic polymer.

By an acrylic polymer is meant polymer based on methyl methacrylate having, optionally, minor amounts of copolymerised monomers. Such monomers, if present, should constitute not more than 10% by weight of the mixture of monomers used to produce the polymer of the sheet and are preferably selected from alkyl acrylates containing from 1 to 8 carbon atoms in the alkyl group.

When acrylic sheets are used it is preferred that they are made by casting technology, including cell and double band cast sheets. Sheet prepared by such a method is of superior optical quality to that prepared by other methods such as by extrusion of a melt of acrylic polymer.

Although it is preferred that the material of the sheet of the laminate is an acrylic sheet, sheets of other polymers may be used. Such sheets include sheets of poly(vinyl chloride), poly(styrene), poly(carbonate), and acrylonitrile/butadiene/styrene resins. Included within the definition of transparent plastics sheets are transparent plastics films. A suitable film which may be bonded to the pattern carrying acrylic sheet is a polyester film, particularly a film of polyethylene terephthalate. These materials may be used to provide the basis of the tinted sheet or to provide the clear sheet of the laminate, if present.

Suitable tinted acrylic sheet which may be used to carry a printed pattern, or which may be used to form a laminate with a clear sheet which carries a pattern include the 'Perspex' range of acrylic sheets available from Imperial Chemical Industries PLC such as 'Perspex' Neutral 912, Neutral 9001, Neutral 914, Neutral 911 and Neutral 504.

When the sheet is in the form of a laminate the preferred method of lamination is by the use of an adhesive cement. The nature of the applied pattern will determine the most suitable cement to be used. Conventional cements, such as the poly(methyl methacrylate) in methyl methacrylate cements which are normally used for bonding acrylic articles are not very suitable for bonding the sheets of the invention when one of the faces of the sheets to be contacted by the adhesive has been printed with printing inks suitable for applying to acrylic surfaces. In such cases the cement attacks the ink causing bleeding and subsequent hazing in addition to damage to the print itself. In such cases a suitable adhesive is a clear one-component room temperature vulcanisable (RTV) acetoxy silicone based on a dihydroxypolysiloxane resin containing phenyl groups and excluding all dimethyl polydimethyl siloxane plasticisers. A suitable material of this type is sold under the trade name 'Arbosil' 1082 by Adshead Ratcliffe Ltd.

When the print is carried in the surface of the sheet in the form of an embedded pattern by the cast polymerisation process it is much more resistant to solvent based adhesives and the conventional adhesives can be used. An inexpensive adhesive conventionally used for bonding acrylic articles comprises a solution of an acrylic polymer in acrylic monomer preferably polymethyl methacrylate in methyl methacrylate monomer. A suitable adhesive of this type is the two component cement sold under the trade name 'Tensol' 70 by Imperial Chemical Industries PLC. In general the adhesives are applied at room temperature and held at room temperature to effect a good bond. Techniques for cementing are described in Technical Service Note PX128 (Third Edition) issued by Imperial Chemical Industries PLC, entitled 'Tensol' cements for 'Perspex': description, techniques and safety information.

Laminates according to the invention may be used for any application in which differential vision is required, such as games courts, security glazing, privacy glazing (such as in caravans) and particularly those situations in which vision via a television camera can be used to advantage.

The invention is further described by reference to the following example.

EXAMPLE

A 3 mm thick sheet of tinted, transparent poly(methyl methacrylate) of the type sold by Imperial Chemical Industries PLC as 'Perspex' Neutral 911, having chromaticity coordinates of (0.306, 0.317) (calculated using Illuminant C as reference) and a tristimulus (Y) value of 62.3 (measured according to the 1931 CIE Colorimetric System) was printed with a pattern of white dots using an ink suitable for printing acrylic sheet by silk screen printing. The white dots had a diameter of 1 mm and were distributed in a regular pattern at a frequency of 50 per square centimeter of sheet. The sheet obtained was suitable for use in restricting vision in one direction through the sheet and would be suitable for use as caravan glazing for improving privacy.

I claim:

1. A coloured thermoplastic sheet carrying a pattern of opaque dots or lines of surface area equivalent to between 20 and 70% of the area of one surface of the sheet wherein the coloured sheet has chromaticity coordinates (x,y), calculated using Illuminant C as reference, lying within the area of a circle of radius 0.15 scale units drawn with the centre of the circle at coordinates (0.33, 0.33) and a tristimulus value (Y) of between 10 and 70, the chromaticity coordinates and the tristimulus values being calculated according to the 1931 Commission Internationale de l'Eclairage (CIE) Colorimetric System in the absence of the applied pattern whereby when viewed under good illumination from the side of the sheet carrying the opaque dots or lines the sheet can apear opaque and when viewed from the other side of the sheet good vision through the sheet is obtained.

2. A thermoplastic sheet according to claim 1 wherein the chromaticity coordinates lie within the area of a circle of radius 0.10 scale units.

3. A thermoplastic sheet according to claim 1 wherein the chromaticity coordinates lie within the area of a circle of radius 0.075 scale units.

4. A thermoplastic sheet according to any one of claims 1 to 3 having a black or brown tint.

5. A thermoplastic sheet according to claim 1 wherein the pattern is of white dots or lines.

6. A thermoplastic sheet according to claim 1 wherein the pattern is printed on the surface of the sheet.

7. A thermoplastic sheet according to claim 1 wherein the pattern is embedded between the surfaces of the sheet.

8. A thermoplastic sheet according to claim 7 wherein the sheet is formed from a laminate of at least two sheets.

9. A thermoplastic sheet according to claim 8 wherein the pattern of dots and lines and the defined chromaticity and tristimulus parameters are provided in the same or different sheets of the laminate.

10. A games court employing thermoplastic sheet according to claim 1 as a playing surface.

* * * * *